US009646253B2

United States Patent
Kankar et al.

(10) Patent No.: US 9,646,253 B2
(45) Date of Patent: May 9, 2017

(54) SYSTEM AND METHOD FOR INFERRING INVISIBLE TRAFFIC

(75) Inventors: Pankaj Kankar, Gurgaon Haryana (IN); Anukool Lakhina, Gurgaon Haryana (IN); Vineet Bharti, Gurgaon Haryana (IN)

(73) Assignee: GUAVUS, INC., San Mateo, CA (US)

( * ) Notice: Subject to any disclaimer, the term of this patent is extended or adjusted under 35 U.S.C. 154(b) by 679 days.

(21) Appl. No.: 13/988,463

(22) PCT Filed: Nov. 24, 2011

(86) PCT No.: PCT/IN2011/000812
§ 371 (c)(1),
(2), (4) Date: Jul. 24, 2013

(87) PCT Pub. No.: WO2012/070070
PCT Pub. Date: May 31, 2012

(65) Prior Publication Data
US 2013/0304692 A1    Nov. 14, 2013

(30) Foreign Application Priority Data

Nov. 26, 2010  (IN) .......................... 2819/DEL/2010

(51) Int. Cl.
*G06N 5/04* (2006.01)
*H04L 12/64* (2006.01)
(52) U.S. Cl.
CPC ......... *G06N 5/048* (2013.01); *H04L 12/6418* (2013.01)

(58) Field of Classification Search
CPC ..... H04L 43/16; H04L 41/142; H04L 43/026; H04L 43/0852; H04L 45/02
See application file for complete search history.

(56) References Cited

U.S. PATENT DOCUMENTS

| | | | |
|---|---|---|---|
| 6,785,240 B1 | 8/2004 | Cao et al. | |
| 7,027,396 B1 | 4/2006 | Golan et al. | |
| 7,574,506 B1 * | 8/2009 | Duffield | H04L 12/2602 709/224 |
| 2003/0108042 A1 | 6/2003 | Skillicorn et al. | |
| 2007/0177506 A1 * | 8/2007 | Singer | H04L 45/38 370/235 |

(Continued)

OTHER PUBLICATIONS

Soule et al. "Traffic Matrices: Balancing Measurements, Inference and Modeling". In SIGMETRICS 2005 Conference, Jun. 6-10, 2005, p. 2, col. 2, paragraph 1-2, p. 5, col. 2, paragraph 1-6.

(Continued)

*Primary Examiner* — Jung Park
(74) *Attorney, Agent, or Firm* — Morgan, Lewis & Bockius LLP

(57) ABSTRACT

This disclosure is directed to techniques for inferring traffic information or estimating total volume of traffic/data flowing through a target network/entity, wherein only a partial subset of inferred traffic information or volume of data is available to a predictor entity/network that infers such traffic information. In an embodiment, such partial subset of total traffic can either be made available to the entity/network for inferring and estimating total traffic or such partial data can actually flow through the entity/network.

18 Claims, 4 Drawing Sheets

(56) References Cited

U.S. PATENT DOCUMENTS

2009/0187795 A1* 7/2009 Doverspike ............. H04L 43/02
 714/43
2009/0271509 A1* 10/2009 Cao ....................... H04L 41/142
 709/224

OTHER PUBLICATIONS

International Search Report for International Application No. PCT/IN2011/000812, issued Apr. 13, 2012 and mailed May 2, 2012. (2 pages).

* cited by examiner

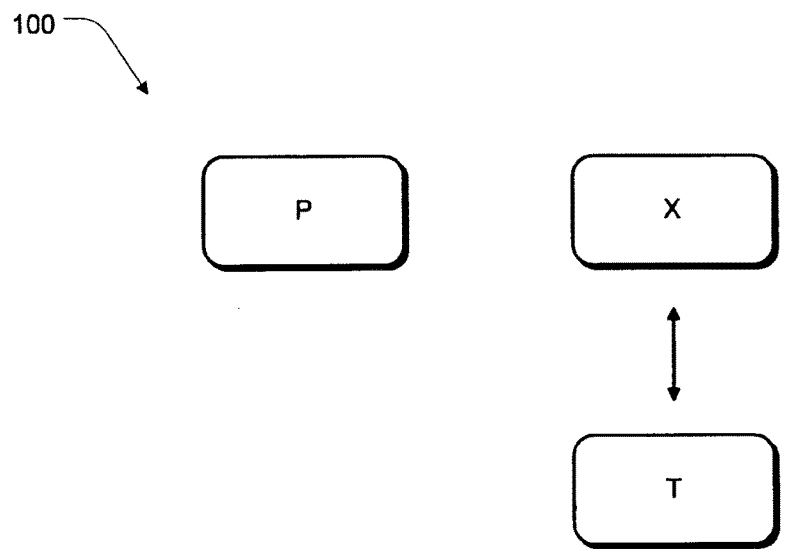
Fig. 1(a)
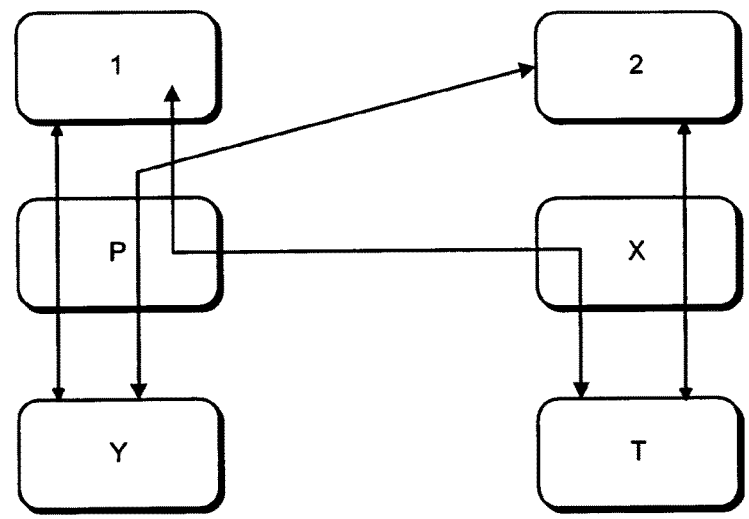
Fig. 1(b)
Fig. 1

SYSTEM AND METHOD FOR INFERRING INVISIBLE TRAFFIC

RELATED APPLICATIONS

This application is a U.S. National Phase Application of PCT/IN2011/000812, filed Nov. 24, 2011, which claims priority to and the benefit of India Patent Application No. 2819/DEL/2010, filed on Nov. 26, 2010, all of which are incorporated herein by reference.

FIELD OF INVENTION

The present invention relates to a system and method for inferring traffic and/or volume of data for a target network/entity from only a partial set of such data and/or traffic being known. In particular, the invention relates to a system and method of inferring traffic information or estimating total volume of traffic/data flowing through a target network/entity, wherein only a partial subset of inferred traffic information or volume of data is available to the entity/network that infers such traffic information.

BACKGROUND OF THE INVENTION

Many of the decisions that Internet Protocol network operators make depend on how the traffic flows in and through their network. When used together with routing information, information on how the traffic flows across networks gives network operators valuable information about the current network state, which can be instrumental in traffic engineering, network management, provisioning, and making important business decisions Apart from IP networks, volume of data flowing through and/or between telecommunication networks and knowledge of attributes of such data can be also crucial for competing telecommunication networks or for entities for which such data can be useful for optimization and analysis of network layout/structure, business decisions, prospect identification for further improvement thereof.

For inferring how traffic flows in a network, typically a traffic matrix is required as an input. A traffic matrix (TM) describes the amount of data traffic that is transmitted between each pair of ingress and egress points in a network. When used together with the routing information, a traffic matrix can give a network operator valuable information about the current network state.

In IP networks, computing effective ranks of TM's is an important tool in numerical analysis and traffic engineering, wherein an effective rank indicates the reduction in dimensionality of a linear system. A TM having a low effective rank suggests that a smaller number of rows (or columns) are sufficient to adequately predict the entire TM by virtue of the rows (or columns) being linearly correlated to each other thereby allowing prediction of the entire TM.

There are often times when a network, at a defined level of aggregation such as at a prefix level or at an atom level is not able to view traffic passing through another network as it is not directly passing through it and is therefore not observable. At the same time, in many situations it is desirable to form an estimate for traffic that is not directly observable so that efficient load balancing and traffic engineering activities can be performed along with monitoring and using the traffic flow trends across AS'es, ISP's, or Customers of ISP's. Further, an improved knowledge of how traffic flows through the Internet as a whole can inform our understanding of how demand, topology, and economics interact to shape Internet evolution.

Similarly, data flowing through telecommunication networks can help stakeholders understand the data flow pattern, inter network linkages, customers calling profile. It is therefore helpful if, based on a partial set of data/traffic available, an entity or a customer can estimate the volume to data flowing through another entity or network and also understand the attributes of such data so as to determine meaningful information.

Further, it would also be important to infer invisible TM elements by allowing an Autonomous System/Network (AS) to predict the amount the invisible traffic passing through other pairs of AS'es/Networks. Currently, no solutions and/or frameworks are present for a predictor network that aims at estimating and inferring information about data/traffic that flows through a target network and is invisible to the predictor network. Typically, currently available works for deducing missing TM elements focus on the time based estimation and are therefore temporal in nature and not spatial as is desired in the above mentioned problem statement. Further, as the correlation between temporally sequenced TM's is strong, they focus on determining network's internal measurements rather than focusing on measuring traffic flowing through or across other networks.

Generally, most existing TM matrix completion methods work on a set of strong assumptions such as a need for the matrices to be uniformly sampled, no irregular scattering of usable visible elements, and low variability in TM elements. These assumptions do not hold good in the mentioned problem statement as the elements in TM matrices across network's or AS'es would have high variability and irregular scattering by nature of the traffic flow.

Further, most known traffic estimation mechanisms such as gravity models use rank-1 or rank-2 models instead of working on TM's having low effective rank. Further these mechanisms are concerned only with TMs within a single network and do not explicitly disclose the low effective rank of the TM's they examine. There is therefore a need for an efficient system and method for inferring traffic information flowing through a target network using a predictor network, wherein the inferred traffic information does not flow through the predictor network.

OBJECTS OF THE INVENTION

It is an object of the invention to provide a system and method for inferring invisible traffic information.

It is an object of the invention to provide a system and method for inferring traffic information flowing through a target network using a predictor network, wherein the inferred traffic information does not flow through the predictor network.

It is an object of the invention to provide a system and method for inferring traffic information, wherein the traffic flow has high variability and is irregularly scattered.

It is an object of the invention to provide a system and method for inferring invisible traffic information using a network/AS, wherein the traffic to be inferred flows through other networks and/or AS'es.

It is an object of the invention to provide a system and method for inferring meaningful traffic information, which is only partially available.

SUMMARY

This disclosure is directed to techniques for inferring traffic information or estimating total volume of traffic/data flowing through a target network/entity, wherein only a partial subset of inferred traffic information or volume of data is available to a predictor entity/network that infers such traffic information. In an embodiment, such partial subset of total traffic can either be made available to the entity/network for inferring and estimating total traffic or such partial data can actually flow through the entity/network.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

FIG. 1 illustrates a network level view showing traffic flow and visibility/invisibility, of traffic flowing through a target network to a predictor network.

DETAILED DESCRIPTION OF PREFERRED EMBODIMENTS

Figure 2:
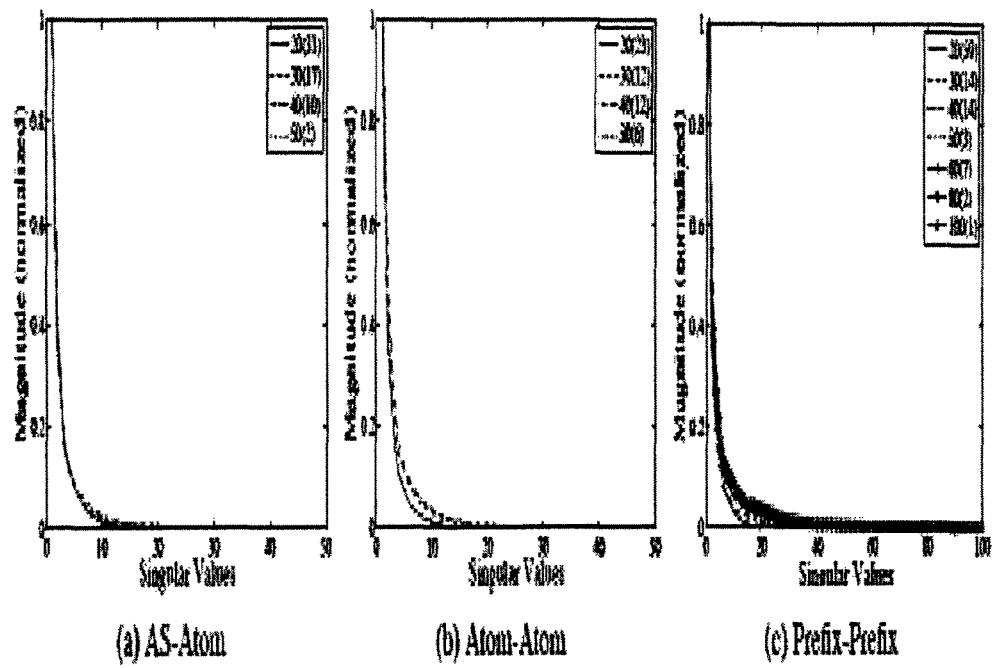
FIG. 2 illustrates singular value decomposition of a traffic matrix to demonstrate that the traffic matrix has a low effective rank.

This disclosure is directed to techniques for inferring traffic information or estimating total volume of traffic/data flowing through a target network/entity, wherein only a partial subset of inferred traffic information or volume of data is available to the entity/network that infers such traffic information. In an embodiment, such partial subset of total traffic can either be made available to the entity/network for inferring and estimating total traffic or such partial data can actually flow through the entity/network. Such an entity/network being configured to predict total traffic and characteristics thereof would be commonly also referred to as the predictor network in the forthcoming disclosure.

It would be appreciated that even through the proposed system and method for inferring invisible traffic is explained through embodiments in the network traffic domain, the same can also be implemented in similar and allied traffic flow architectures such as in the telecommunication industry, wherein estimates and inferences for the volume of data/calls being made between service providers and/or specific customers and attributes of such data/calls can be estimated using the similar methods as proposed below.

FIG. 1 (a) shows an exemplary illustration of the network layout, wherein the proposed system and method is configured to enable a predictor network P to estimate the amount of traffic flowing through a target network T. In an embodiment, the network P is also configured to infer the traffic flowing between the target network T and another network such as X. As this traffic of T to X does not flow through P and is therefore invisible to P, the network P cannot directly measure it.

FIG. 1 (b) shows another exemplary illustration of the network layout, wherein the proposed system and method can, from a partial set of traffic flowing between P and T, enable P to infer traffic flowing between X and T. As shown, Y is a customer of P, wherein Y uses P to send/receive data to 1 and 2. Similarly, T uses P to send traffic to 1 and therefore P has Y's traffic to 1 and 2 and T's traffic to 1 visible to itself, analysis of these flow may enable P to estimate traffic flowing to T through X and further also total traffic flowing between X and T enabling P to infer the traffic flowing between X and T.

In an embodiment, for P to infer traffic flowing through T or traffic flowing between X and T, the traffic from T need not pass, through P and even if a partial subset of data is made available to P by another network, say Q, through which T's data flows, estimation of the total traffic flowing through T can be made by P.

In an embodiment, the traffic matrices need to maintain atomicity to ensure reliable inference of the invisible traffic. Atomicity, as defined for groups of IP Addresses, ensures that the traffic flowing between such groups is always routed in a similar fashion for a defined period of time. A group, in such a case, can be at an IP level, or a Prefix level, or an Atom level, or an AS level or at a group of AS level. A group level having a defined granularity can therefore be called as atomic if that group demonstrates routing in the same fashion across a defined period of time. Therefore, as would be obvious, with the routing behavior being dynamic at an AS level when compared with a Prefix level, the higher the hierarchy/aggregation of a group level, lower is the atomicity.

In another embodiment, for the TM's in which the invisible elements need to be predicted by a predictor network P, there are strong correlations between columns (or rows), such that a measured TM can be approximated by a matrix having relatively small rank. Matrix M has effective rank r if M can be approximated by a rank-r matrix, that is, if there exists a rank-r matrix M' such that $\Sigma(M_{ij}-M'_{ij})^2$ is suitably small. Such a matrix having low effective rank would ensure that the TM columns and/or rows are linearly correlated and show a low effective rank.

In an embodiment, for a given network P having an interval during which there are no changes in external routing, there is a set of IP source-destination pairs (s,d) such that if s generates traffic and sends it to d, that traffic will pass through P. This set is called the network's view during that interval. In an embodiment, such an interval can be a day or a week or any desired time interval.

As discussed above, a traffic matrix (TM) is a m×n matrix M(l) in which $M_{ij}(l)$ is a measure of some subset of the traffic flowing from a set of addresses $S_i$ to a set of addresses $D_j$ during a specific time interval $\{t|t_i<t<t_i+1\}$. In an embodiment, elements $M_{ij}$ can be any traffic measure such as the number of bytes or the number of packets. For illustration purposes, TM for a particular network is illustrated as a superscript such as $M^T$, which indicates the traffic matrix for the target network T. Similarly, $M^P$ indicates the traffic matrix of the predictor network P.

For achieving a desired level of invisible traffic estimation by a predictor network P, it is necessary to distinguish between TM values that are known and those that are unknown as only the known TM values are useful as input to the estimation problem. If a TM element is fully visible in the predictor network, then it is useful as an input. In an embodiment, partially-visible elements may not be useful as inputs as even though they may contain some useful information, they introduce complexity. Of course, invisible elements are not useful as inputs. In an embodiment, visibility of a TM element can be determined based on the indexing level chosen for a particular matrix M.

An indexing is a particular choice I=(S, D) with S={$S_i$|i∈1 ... m} and D={$D_j$|j∈1 ... n}. Each $S_i$ and each $D_j$ is a set of IP addresses. We assume that the sets $S_i$, i=1 ... m are disjoint, as are the sets $D_j$, j=1 ... n. If S and D each form a partition over the entire routable address space, then a TM with indexing I is a fully visible TM. Otherwise it is a partially visible TM.

For instance, consider a particular network N for which is measured a TM M having indexing I=(S, D). Element $M_{ij}$ is fully visible in N if, for all (s,d) ∈ {$S_i \times D_j$}, (s,d) is contained in N's view. Likewise, element $M_{ij}$ is invisible in N if no (s,d)∈{$S_i \times D_j$} is contained in N's view. Elements that are neither fully visible nor invisible in N are partially visible.

In practice, it is difficult to use an indexing to mark the fully-visible elements as known and the rest as unknown. The reason has to do with the organization of the interdomain routing system, and where knowledge of the state of the routing system actually resides. For instance in FIG. 1(b), if T changes its routing so that traffic to 1 goes through some provider other than X (and hence no longer passes through P), the Border Gateway Protocol (BGP) does not require that this fact be announced to P. Therefore, it is difficult for P to know what its view is, based on the information provided to it by the routing system. This makes it difficult to identify the visibility status in P (fully visible, invisible, or neither) of any given element in an arbitrary indexing. In such a case, a possible solution is to define an indexing for P's TM such that each element is either invisible, or fully visible, making the indexing atomic for P. Such an indexing would ensure that no elements are partially visible in P. Formally, given a particular network P, an indexing I is atomic for P if, in a TM M using indexing I, each element $M_{ij}$ is either fully visible in P, or invisible in P.

In a preferred embodiment of the invention, the proposed system and method assumes that the TM M for P has a low effective rank and that the indexing I is atomic for the predictor network P. The choice of indexing I therefore has a significant impact on the correctness of traffic estimation with the higher the level of aggregation (IP Address, Prefix, Atom, AS, Group of AS'es), lower is the atomicity and lower is the effective rank giving a tradeoff between the effective rank and the atomic indexing. Aggregation, also referred to as spatial granularity, is defined by the number of source-destination pairs that are assigned to each TM element with IP Address being the lowest level of aggregation and complete internet being the highest level. Increasing aggregation leads to smaller reduced data size, which reduces the computational demands.

Putting the above mentioned assumptions for the telecommunication industry, we can observe that the atomicity in the telecom industry is maintained till a higher aggregation level, as given the fixed inter telecon network agreements, how the calls would be routed across networks from one network to another is known and same. Further, the assumption relating to the TM M having a low effective rank also holds true as a smaller subset of calls from a subscriber to other subscribers affiliated with other service providers can indicate and predict the total estimated number of calls being made by the subscriber across each service provider. Therefore, the proposed solution for estimating the invisible traffic is applicable.

In an embodiment, in an IP-IP indexing (S, D), each routable IP address constitutes a distinct element $S_i$ and a distinct element $D_j$. This indexing is clearly atomic for any network, because traffic for each IP address pair ($S_i$, $D_j$) either passes through a given network, or not. At a coarser level, one can group addresses according to the longest matching network prefixes that are advertised in the BGP system. In this case each $S_i$ and $D_j$ corresponds to all of the addresses matching a particular prefix. The nature of inter-domain routing via BGP dictates that indexing at the prefix-prefix level will be atomic for any network. This is because all the addresses matching a prefix are routed the same way in any given router. A further level of coarsening can be done at an Atom-Atom level or an AS-Atom level.

As disclosed above, the TM M for an efficient prediction of invisible traffic would have the M having a low effective rank. The rank can be computed and tested to be low using the Singular Value Decomposition (SVD) of $M=U\Sigma V^T$ and extracting the singular values from the diagonal of $\Sigma$ (the eigen spectrum of M). These values give a measure of how much each additional increase in rank improves an optimal approximation of M. If it is the case that beyond the first r singular values the remaining singular values are all small, we can conclude that M has effective rank r.

To assess the effective rank for spatial traffic matrices, a simple method to extract dense square matrices from our sparse matrix $M^{(P)}$ can be conducted. A large set of non-overlapping matrices can then be extracted from the prefix-prefix, atom-atom, and AS-atom matrices for a particular and defined time interval. The matrices that are extracted can vary in size such as in the illustrated FIG. 2, the size varies from 20×20 up to 100×100. Eigenspectrum of each extracted matrix can be then be computed and each spectrum can be normalized to set its largest singular value to 1.

As the focus of the study is to understand the relationship between matrix size and effective rank, eigenspectra for each matrix size is averaged and the resulting averaged spectra are illustrated in FIG. 2. The figure label of FIG. 2 illustrates the size (number of rows or columns) of each matrix as well as the number of non-overlapping matrices whose spectra were averaged into the curve shown. FIG. 2 compares the averaged eigenspectra for different-sized matrices giving two characteristics: first that the effective rank does not seem to vary appreciably as a function of matrix size. Second that the effective rank does not seem to vary appreciably with the degree of aggregation: prefix-prefix, atom-atom, and AS-atom matrices all show similar eigenspectra. Hence we find that dense submatrices of M typically show very low effective rank. While this does not directly inform about the effective rank of M as a whole, the consistency of the results with respect to size and aggregation level suggest that M itself is likely to show low effective rank.

In an embodiment, TM elements of an invisible traffic can be estimated using linear estimators. This is because as the TM's show a low effective rank, a typical column can be expressed as a linear combination of a small number of orthogonal vectors. A linear estimator takes the form $$\hat{t}=A\beta$$

where the elements of A are model inputs, the elements of $\beta$ are the model parameters, and elements of $\hat{t}$ are the model outputs (the estimations). In a preferred embodiment of the invention, both A and $\beta$ need to be identified from the elements which are visible to P in the TM M. Because, in typically scenarios, the visible elements are irregularly scattered in M, the simplest approach for invisible traffic estimation is to construct a separate linear estimator for each target network T. The estimator then becomes $\hat{t}=a^T\beta$, wherein t is a scalar, and a and $\beta$ are column vectors.

In an embodiment, in order to estimate $\beta$, a tableau shown below can be constructed for each target t having position (i, j) in M.

| Predictor Rows | Predictor Columns X | j y |
|---|---|---|
| i | $a^T$ | ? |

That is, we need to find predictor rows and columns in M such that X, y, and a are all visible in P. Having done that, we could then estimate $\hat{\beta}$ as the least-squares solution to y=Xβ, and then estimate the target element as $\hat{t}=a^T\hat{\beta}$.

In an embodiment, before the invisible traffic estimation method is initiated, a step of densification can be carried out. Densification process includes sorting of the traffic matrix by maximally fit TM elements based on the target elements to be identified. This sorting allows re-arranging of the TM such that the relevant and meaningful TM elements (rows or columns) are group together to easy extraction and analysis.

In another embodiment of the invention, principal component (PC) regression (PC) can also be used for estimating the invisible elements of the target network. In the PC regression method, instead of regressing y against the columns of X, we regress y against the few important (column) eigenvectors of X. To apply PC regression one chooses a value k and discards the s-k least significant eigenvectors, where s=min(m, n) for X having size m×n. This can be accomplished by implementing singular value decomposition of X: $U\Sigma V^T$=X. Setting $\tilde{X}$ to be the k columns of U with largest singular values (entries on the diagonal of Σ), one can form the PC regression estimate of β by least squares:

$$\hat{\beta}=\arg\min_\beta \|\tilde{X}\beta-y\|.$$

Thus, for any given value of k, PC regression is equivalent to setting the s-k smallest singular values of X to zero before estimating β. PC regression can therefore be seen as a kind of smoothing or noise reduction in X. This smoothing retains most of the predictive information in X but transforms that information into a set of orthogonal predictors [18] X which, by nature of their lack of correlation, yield a more stable estimate of β.

In yet another embodiment, ridge regression can be incorporated for estimating the invisible TM elements. The idea behind ridge regression is that when β is unstable, its individual elements will typically be very large. Ridge regression imposes a penalty on large values of β:

$$\hat{\beta}=\arg\min_\beta \|X\beta-y\|+\lambda\|\beta\|$$

with λ>0. It can be shown that ridge regression is equivalent to the least-squares solution of $\hat{\beta}=\arg\min_\beta \|\tilde{X}\beta-y\|$ where $\tilde{X}$ is formed from X as follows. Starting again from the SVD X=$U\Sigma V^T$, a new $\tilde{\Sigma}$ is formed by shrinking the singular values:

$$\tilde{\sigma}_i = \frac{\sigma_i^2}{\sigma_i^2+\lambda}\sigma_i.$$

and $\tilde{X}$ is then constructed from $\tilde{X}=U\tilde{\Sigma}V^T$: Therefore, in essence, while PC regression sets the s-k smallest singular values of X to zero, ridge regression shrinks all the singular values of X, with a greater amount of shrinkage applied to the smaller singular values. The result of the estimation can be plotted in terms of the effective degrees of freedom of the ridge regression fit. This can be defined as:

$$df(\lambda) = \sum_{j=1}^{s} \frac{\sigma_j^2}{\sigma_j^2+\lambda}$$

noting that df(0)=s, and when λ→∞, df(λ)→0.

In an embodiment, both PC regression and ridge regression introduce the additional need to determine the proper value of a tuning parameter (k or λ). Determining the best value of the tuning parameter to use in general can be approached via cross-validation, wherein by using $\tilde{\beta}$ derived from $\tilde{X}$ and y, one can estimate other known values of M. One can then choose a tuning parameter value that minimizes the resulting cross-validation error.

In an embodiment, Traffic Matrix completion addresses the problem of recovering a low-rank matrix from a subset of its entries. Suppose M is an m×n matrix that has rank r<<min (m, n) or that can be approximated by a rank r matrix. Assume that only a subset of M's elements Ω={(i, j)} are known. If the set Ω contains enough information, and M meets a condition called incoherence, then there is a unique rank-r matrix that is consistent with the observed entries.

Incoherence means that singular vectors of M are spread across all coordinates, i.e. they are not correlated with the standard basis vectors. In essence this means that the singular vectors are not 'spiky,' as would occur when a few entries of M are much larger than the others. The condition of sufficient information in Ω is met when the set Ω is sampled from the entries of M uniformly at random, and with sufficient density (of the order O(r(m+n) polylog (m+n))).

A variety of algorithms have been proposed for recovering M. Most rely on a convex optimization technique, which aims at minimizing the nuclear norm (sum of the singular values) of a matrix W such that Wij=Mij, (i, j)∈Ω. These approaches tend to be computationally demanding for large matrices. In a preferred embodiment LMaFit (Zaiwen Wen, Wotao Yin, and Yin Zhang. Solving a low-rank factorizationmodel formatrix completion by a nonlinear successive over-relaxation algorithm. Technical report, Rice University, 2010. CAAM Technical Report TR10-07) can be used as it does not rely on nuclear norm minimization, and has been found to be fast and robust.

Further, existing matrix completion methods assume that M and Ω are given. However, in the proposed methods for element estimation, M may not meet the requirements of the method. In particular, the density of any given row or column of M is not guaranteed to be sufficient to allow estimation of its missing entries. Hence for each M, a submatrix S can be selected such that there is no less than k entries in each row and column of S. Increasing k represents a trade-off between increasing the information available for estimation and decreasing the number of entries that can be estimated. It has been found through experiments that the size of S dropped off sharply for k>50; at k=50, the fraction of traffic in M that was contained in S was 91-99% for prefix-prefix matrices, and 80-88% for atom-atom and AS-atom matrices. Therefore k=50 was used in the present experiments.

As regards errors, in an embodiment, two kinds of errors can be measured namely error in estimating individual invisible elements, and error in estimating the total amount of invisible traffic flowing through target network T. It may also be desired to estimate the elements that are visible in T and invisible in P. However, as discussed earlier, we do not know the exact views corresponding to T or P, and therefore we approximate the set of targets τ as:

$$\tau = \{(i,j) | M_{ij}^{(T)} \neq 0 \text{ and } M_{ij}^{(P)} = 0\}$$

In another embodiment, to measure error in estimating individual elements of τ, Normalized Mean Absolute Error (NMAE) can be used as:

$$NMAE = \frac{\Sigma_{(i,j)\in\tau} |M_{ij}^{(T)} - \hat{M}_{ij}|}{\Sigma_{(i,j)\in\tau} M_{ij}^{(T)}}$$

where the $\hat{M}_{ij}$ is estimated using information only from P. To measure error in estimating the total invisible traffic, Absolute Relative Error (of the total) can be used as follows:

$$RE = \frac{|\Sigma_{(i,j)\in\tau} \hat{M}_{ij} - \Sigma_{(i,j)\in\tau} M_{ij}^{(T)}|}{\Sigma_{(i,j)\in\tau} M_{ij}^{(T)}}.$$

Figure 3:
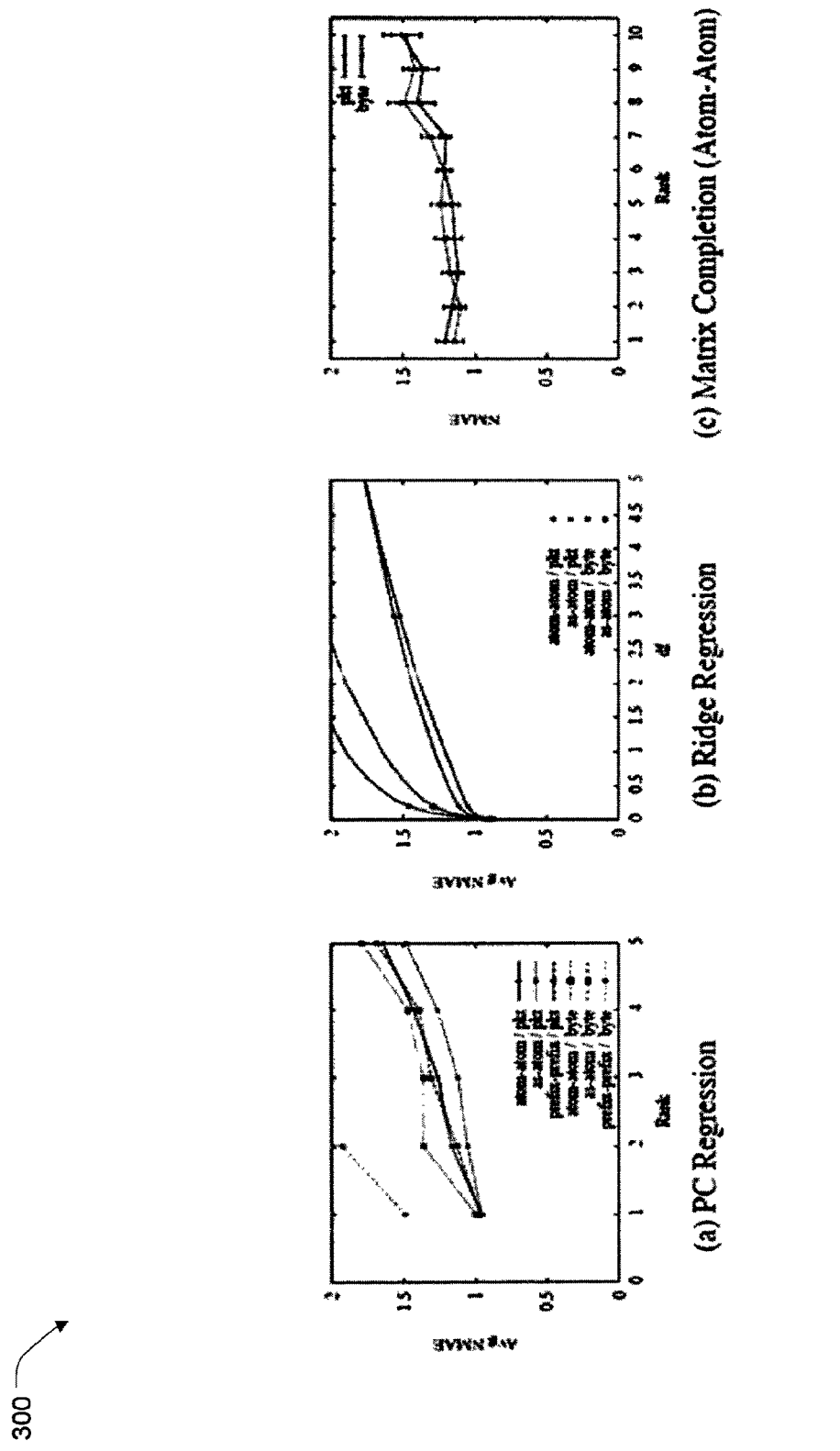
FIG. 3 illustrates the accuracy obtained in estimating each individual element.

FIG. 3 illustrates the accuracy obtained in estimating each individual element. As shown in FIG. 3, NMAE was computed for the estimates for a period of 14 days, wherein each point shown in FIG. 3 represents the average over the 14 days. Error bars having small variations have been omitted for clarity. FIG. 3 illustrates a number of other results. First, the regression methods are more effective in general than in matrix completion. Secondly, the plots show that regression methods show improvement with increased regularization (decreased rank or df of ~X). This reflects the strong correlation in measured TMs. However, matrix completion does not show a significant dependence on the assumed rank r. Thirdly, it can be seen that the particular kind of regularization applied by ridge regression is the most effective kind for the data used for the current problem. For ridge regression, the magnitudes of NMAE found in the best cases are between 0.8 and 1 (with 0<df<0.2). This means that average error in the estimates is less than the average magnitude of a TM element.

Figure 4:
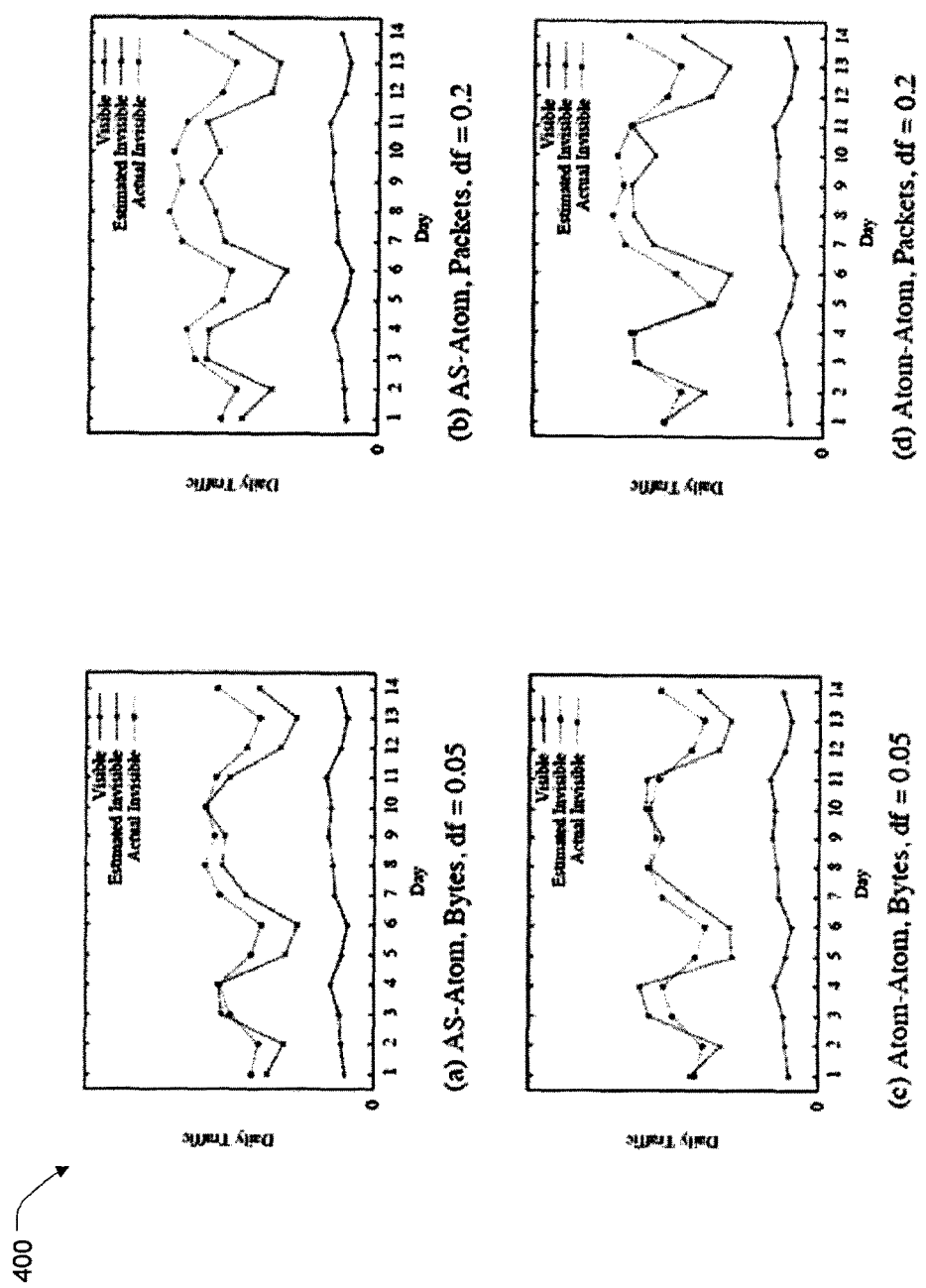
FIG. 4 illustrates actual and estimated total invisible traffic, and for comparison purposes, the volume of traffic that flows through the predictor network and the target network.

In an embodiment, summing all the estimates for a defined period such as a day leads to an estimate for the total amount of invisible traffic flowing through T. An exemplary and experimental view of the accuracy of estimation can be obtained by looking at the comparison between daily estimates and actual values of the total traffic flowing through T as shown in FIG. 4 for the ridge regression method. FIG. 4 shows actual and estimated total invisible traffic, and for comparison purposes, the volume of traffic that flows through both P and T. This latter traffic constitutes the information used by P to estimate the total traffic through T. FIG. 4 further shows that for both packets and bytes, whether using the atom-atom or AS-atom aggregations, measurements taken in P are sufficient to accurately estimate day-over-day traffic volumes in T.

In an embodiment, traffic matrix elements of the predictor network can be grouped based on hop distance (number of hops between source and destination) between source and destination of the traffic matrix elements, and can further be grouped based on models used for estimating the traffic matrix elements of the groups.

The invention claimed is:

1. A method of estimating data traffic flowing through a target data or telecommunications network using a predictor network to which only a subset of the data traffic through the target network is visible, the target and predictor networks comprising a plurality of routers having ingress and egress points, the data traffic being generated within the target data or telecommunications network, the method comprising the steps of:
    measuring, by a processor, the generated data traffic for a predetermined time interval based on a number of bytes or a number of packets;
    representing, by the processor, the measured data traffic flowing through the target network between physical egress ports of source routers and physical ingress ports of destination routers as a first traffic matrix with elements corresponding to addresses of routers within the target network, wherein the measured data traffic flowing through the target network passes through physical egress ports of source routers of the target network to physical ingress ports of destination routers according to routing information;
    representing a portion of the measured data traffic visible to the predictor network as a second traffic matrix with elements corresponding to addresses within the predictor network, wherein the data traffic visible to the predictor network passes physical egress ports of source routers of the predictor network to physical ingress ports of destination routers according to routing information;
    extracting, as model inputs A, traffic matrix elements from the second traffic matrix;
    identifying a plurality of model parameters β based on rows and columns of the second traffic matrix;
    linearly estimating traffic elements ^t of the first target matrix based on the model inputs A and the model parameters β; and
    estimating the data traffic flowing through the target network based on the estimated traffic elements ^t.

2. The method of claim 1, wherein each said traffic element At is estimated by multiplication of corresponding said model input A and corresponding said model parameter β.

3. The method of claim 1, wherein rows and columns of the second traffic matrix are divided into groups X and y, wherein group X comprises rows and columns having known values, and wherein group y comprises multiple rows having known values and a single column having traffic element to be estimated, further wherein model parameter β is computed through the relationship y=Xβ.

4. The method of claim 3, wherein group y is regressed against a subset of group X using principal component regression, wherein said subset represents important eigenvectors of group X.

5. The method of claim 4, wherein said subset of group X is computed based on singular value decomposition of X giving k significant columns.

6. The method of claim 3, further comprising the step of computing modified value of model parameter β as ^β=arg minβ||Xβ−y||+λ||β||, wherein λ>0.

7. The method of claim 1, wherein the second traffic matrix has a low effective rank.

8. The method of claim 1, wherein the second traffic matrix network is indexed to maintain atomicity.

9. The method of claim 8, wherein the second traffic matrix is indexed such that all IP addresses within said index are routed in a similar fashion by all BGP peers.

10. The method of claim 8, wherein said indexing is at BGP prefixes.

11. The method of claim 8, wherein said indexing is at BGP atoms.

12. The method of claim 1, wherein bytes and/or packets are used as a measure of said traffic.

13. The method of claim 1, wherein an observable portion of traffic flowing through the target network flows through the predictor network.

14. The method of claim 1, wherein observable traffic of said predictor network does not flow through said predictor network and is provided as an external input.

15. The method of claim 1, wherein elements of the second traffic matrix are grouped based on hop distance between source and destination routers corresponding to the matrix elements.

16. The method of claim 1, further comprising the step of sorting elements of the first matrix elements.

17. The method of claim 1 wherein the target network is the entire internet.

18. The method of claim 1, further comprising using traffic completion for estimating elements of the second traffic.

* * * * *